April 3, 1934. A. J. DENISTON, JR 1,953,592
COMBINED FASTENING AND SEALING DEVICE
Filed Oct. 26, 1933
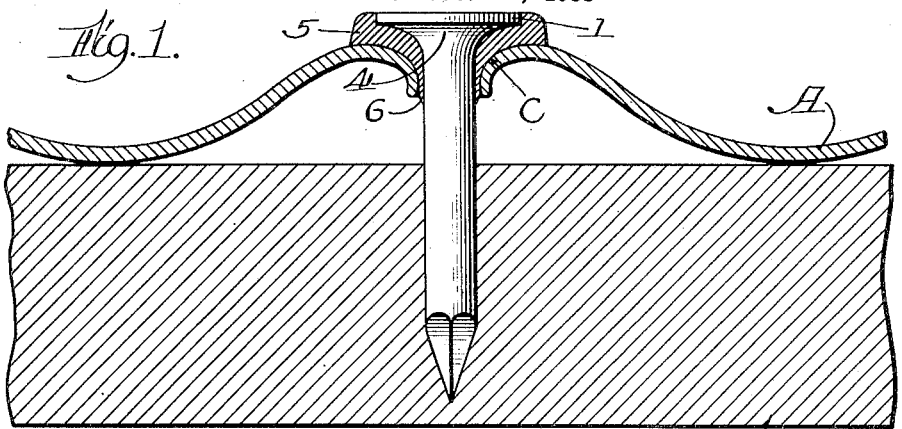
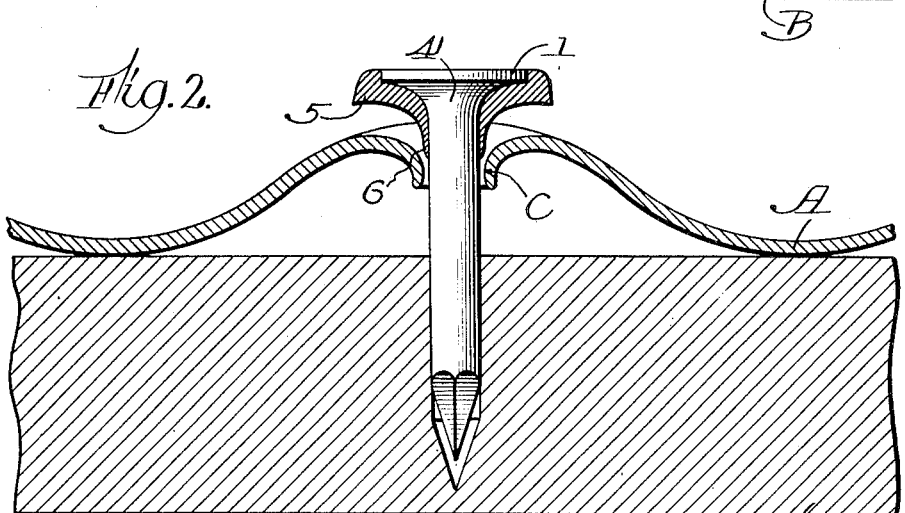
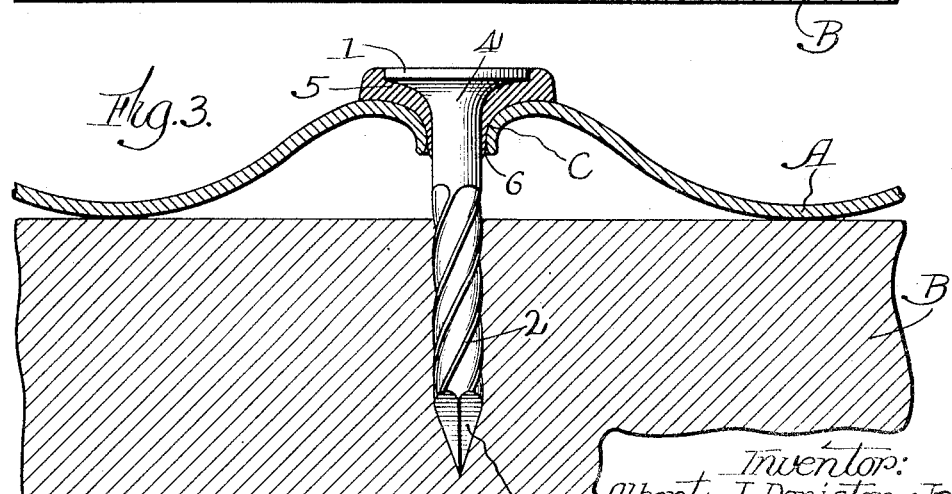
Inventor:
Albert J. Deniston Jr.
By: LaPorte & LaPorte Atty's.

Patented Apr. 3, 1934

1,953,592

UNITED STATES PATENT OFFICE 1,953,592

COMBINED FASTENING AND SEALING DEVICE

Albert J. Deniston, Jr., Chicago, Ill.

Application October 26, 1933, Serial No. 695,235

1 Claim. (Cl. 85—28)

This invention has reference to a combined fastening and sealing device for use in securing sheet metal roofings to wooden understructures.

The invention has for its principal object to improve the fastener disclosed and claimed in Letters Patent issued to me March 16, 1926, No. 1,576,727, for an improved fastening device for sheet-metal roofings and sidings; whereby to effectuate a permanent and positive lead seal at the nail hole and around the nail where the galvanizing breaks away on sheet steel roofing.

In the instant patent there is disclosed a wire nail of the ord'nary well known form, having the usual flat head. Around the neck of the nail is permanently secured, either by casting or diepressure a conical washer or lead or other soft metal. Said washer encircles the neck of the nail immediately below the head and also covers the underside and periphery of the head, the flat top surface of the washer being flush with the flat top surface of the head. In other words, the head of the nail is countersunk in the top of the washer to an extent that leaves its upper surface substantially flush and continuous with the upper surface of the latter. The function and purpose of this nail is to seal the nail hole with lead and to cover the break in the galvanizing around the nail hole, caused by driving a nail through the sheet when applying corrugated galvanized sheet steel roofing. Under ordinary and normal conditions, the nail of my patent will meet all the usual and necessary requirements and effectuate a lead seal. Conditions, however, over which the manufacturer of nails, as well as the manufacturer of sheet steel roofing, have no control and conditions under which such a roofing is used produces a situation, which, at times, makes for ineffectiveness in the use of a nail having the ordinary and well known shank and in such a situation the lead seal is broken, resulting in leakage around the nail and rusting of the sheet at this point. It is such a condition which I wish to obviate and do obviate by combining with my lead seal a shank, which, when driven through the metal sheet and into the wood understructure will provide a permanent and positive lead seal at the opening in the metal sheet not disturbable by climatic conditions, character of wood or metal and capable of withstanding heavy winds causing vibration of the sheet, which ordinarily will loosen the ordinary nail and cause an unseating of the head and seal and so remain.

To briefly enumerate these conditions, there are different gauges or thicknesses of sheet steel roofing; there are many different kinds of wood to which such roofing is nailed and again, there are the different practices of how many nails are used to the square of roofing and how close the nails are placed together. All of these conditions tend to govern how well the sheet roofing will be held in place. In the use of such roofing, many times it is nailed only to scantling, i. e., "two-by-fours" placed on two foot centers and the sheets nailed only on to the "two-by-fours" with no sheathing underneath the sheet. Many of the roofs applied are only shelters with no siding, which allows the wind to get underneath the roof and this causes a vibration which will loosen the ordinary nail. On all roofs there is more or less vibration which is one of the reasons for nails "walking" out of a roof.

Another condition, which causes nails to loosen, is the expansion and contraction of sheets under different climatic conditions. The use of different kinds of wood into which the nails are driven is another important factor to be considered—whether the wood is soft or hard wood—whether it is dried or green. The different climatic conditions in the different sections of the country is also a factor.

It should be apparent, therefore, that there are many reasons why nails with an ordinary shank will back or pull out from the roofing material and if these nails, as in the instant patent referred to, embody a lead seal, such seal is broken and made ineffective, allowing for leakage down around the nail, and results in the rusting of the sheet at this point.

The object which I seek and have obtained is not only to hold the roof in place, but also to hold the lead seal in its original driven position so as to effectuate a permanent and positive lead seal at the nail hole and around the nail hole where the galvanizing breaks away on the sheet steel roofing, thus prolonging the life of the roofing. I accomplish this result by combining the lead seal or washer associated with the head of the nail and the upper end of the shank, a shank, the length of which is preferably a driving screw. Such a shank when driven will stay put; will eliminate the necessity of drilling or punching holes and will hold four or five times better than a nail having the ordinary smooth straight shank and thereby overcome the difficulties regarding the different kinds and qualities of woods, as well as changes in temperatures which cause the sheet to expand and contract.

That the invention may be more fully understood, reference is had to the accompanying drawing forming part of this description, illustrating a preferred embodiment of the invention, in which in:—

Fig. 1 there is shown a view of my nail, having an ordinary shank as manufactured in accordance with the instant patent, to which reference is made and showing such nail, as in actual use, securing a sheet of metal roofing to a wood under-structure, the lead seal sealing the opening around the nail where driven through the sheet and around the nail hole where the galvanizing breaks away on the sheet steel roofing;

Fig. 2 is a view similar to Fig. 1, except that under certain of the conditions hereinbefore enumerated, the nail has pulled or backed out, become loosened and lifted out and in so doing not only left the roofs insecurely held, but more important has unseated the lead seal, exposing the opening in the sheet which will permit leakage down around the nail and result in rusting of the sheet at this point, and Fig. 3 is a view similar to Figs. 1 and 2 except that there is shown my improved combined fastening and sealing device effectually and permanently securing a sheet steel roofing to an understructure of wood, said device employing in combination with the lead seal associated with the head of the nail and neck of the shank, a shank formed or provided with a driving screw, which will resist any tendency to lift, back or pull out and thereby firmly hold the lead seal in sealing position so as to permanently plug the nail hole in the sheet around the nail and permanently seal the break in the galvanizing.

Like characters of reference denote corresponding parts throughout the figures.

In illustrating the practical use of my combined fastener and sealing device, I have shown it in Fig. 3 securing a sheet steel roofing A to an understructure of wood B. No invention lies in either of these elements so that further description thereof is unnecessary. These elements are similarly shown in Figs. 1 and 2, and with an ordinary smooth shank nail fastening the sheet A to the wood B and in each instance the shank is combined with a washer of lead or other soft material as the sealing medium for sealing the hole around the nail and the break in the galvanizing caused by the driving of the nail through the sheet. In Fig. 2, due to certain conditions, the seal has become permanently broken or unseated, which my improvement, as disclosed in Fig. 3, obviates and prevents and insures an effectual, permanent and positive seal.

The combined fastening and sealing device comprises as a unitary structure a nail having a flat head 1 and a shank formed or provided with a driving screw 2. This portion of the nail extends preferably from a point adjacent the point 3 to a point preferably removed a suitable distance from a filet 4 which, merging into the shank, constitutes the neck of the nail. Around the neck of the nail is permanently secured either by casting or die-pressure a conical washer 45 of lead or other soft metal. The washer preferably encircles the neck of the nail and extends partway down the shank from the filet 4, so as to insure that when the nail is driven through the sheet A and causing an opening C therethrough, the depending portion or tubular-like portion 6 of the washer which forms a filet will enter and protrude through such opening and together with the body of the washer beneath the head of the nail will seat itself against the surface of the metal sheet and within the opening to effectually seal the same around the nail to prevent leakage and protect against corrosion the break in the galvanizing on the sheet at this point, as well as the rotting of the wood beneath. Due to the spiral formation of the shank, the nail rotates during driving thereof and consequently the underside of the lead head or sealing member and the filet are ground to a seat by the harder metal of the roofing, whereby the sealing member is tightly conformed to the walls of the opening in the roofing through which the nail has been driven, and also to the parts of the roofing surrounding the opening. The screw 2 being driven into the wood B will positively hold the nail against rising or pulling out and thereby insure the seating of the lead seal against loosening or becoming unseated or dislodged. The washer 5 furthermore also covers the underside of the head 1 and also the periphery thereof, the flat top surface of the washer, as shown, being flush with the flat top surface of the head 1. In effect, the head of the nail is countersunk in the top of the washer to an extent that leaves its upper surface flush and continuous with the upper surface of the latter.

I am aware that it is not new to provide or form the shank of a nail with a screw portion to serve as a holding means for the nail when driven. Also I am aware that it is not new to provide an ordinary nail with a lead or soft metal seat at its head portion to provide a seal. I am not aware, however, that a combined fastening and sealing device has been suggested to meet the requirements herein stated, where there has been combined in a unitary structure the element of the driving screw in association with a washer, providing a seal, the former adapted to effectuate a permanent securing means for the sheet on its support and an effectual seating and holding of the sealing means against displacement and dislodgement, whereby to prevent leakage and corrosion. These advantages are not present in any articles of manufacture with which I am familiar and the combination presents a device which is simple, inexpensive and very efficient for the purposes intended.

What I claim is:—

A combined fastening and sealing device for metal roofing, comprising a nail having a head and a shank, said shank beneath the head being of spiral formation to form a screw terminating in a point whereby to enable the nail to be hammer-driven into position, thereby to have rotation imparted to it during said driving, and a sealing member having a filet encircling the shank and abutting the underface of the head to seal the opening in the roofing resultant from the driving of the nail through the roofing, said sealing member being formed of metal softer than that of the roofing, whereby during driving of the nail its rotation causes the filet of the sealing member to be conformed to and to seal said opening in the roofing.

ALBERT J. DENISTON, Jr.